United States Patent
Kato et al.

(10) Patent No.: US 7,340,623 B2
(45) Date of Patent: Mar. 4, 2008

(54) POWER-SAVE COMPUTING APPARATUS AND METHOD, A POWER-SAVE COMPUTING PROGRAM AND A PROGRAM PRODUCT

(75) Inventors: Shinsuke Kato, Kobe (JP); Tetsuji Yamamoto, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 716 days.

(21) Appl. No.: 10/796,203

(22) Filed: Mar. 10, 2004

(65) Prior Publication Data
US 2004/0181660 A1   Sep. 16, 2004

(30) Foreign Application Priority Data
Mar. 10, 2003   (JP)   ............... 2003-063291

(51) Int. Cl.
G06F 1/26   (2006.01)
G06F 1/00   (2006.01)
(52) U.S. Cl. ....................... 713/320; 713/300
(58) Field of Classification Search ............. 713/320
See application file for complete search history.

(56) References Cited

U.S. PATENT DOCUMENTS

| | | | |
|---|---|---|---|
| 5,737,616 A | 4/1998 | Watanabe | |
| 6,167,524 A * | 12/2000 | Goodnow et al. | 713/300 |
| 6,498,957 B1 * | 12/2002 | Umetsu | 700/22 |
| 6,574,740 B1 * | 6/2003 | Odaohhara et al. | 713/323 |

FOREIGN PATENT DOCUMENTS

JP   8-314587   11/1996

* cited by examiner

*Primary Examiner*—Rehana Perveen
*Assistant Examiner*—Stefan Stoynov
(74) *Attorney, Agent, or Firm*—Wenderoth, Lind & Ponack L.L.P.

(57) ABSTRACT

A device information administrator detects a fluctuation in a total consumed power of a power-consuming device group and determines and outputs a consumed power to be changed by any of devices in the power-consuming device group so as to suppress this fluctuation. A power-save determinator generates and outputs a control command for at least one device of the power-consuming device group so that the total consumed power of the power-consuming device group changes in accordance with the consumed power to be changed outputted from the device information administrator. A device controller controls at least one device corresponding to the control command outputted from the power-save determinator in accordance with the control command. Accordingly, the fluctuation in the total consumed power of one or more power-consuming devices can be effectively suppressed.

9 Claims, 12 Drawing Sheets

FIG. 2

| DEVICES IN SYSTEM | PREVIOUS CONSUMED POWER (IN WATT) | PRESENT CONSUMED POWER (IN WATT) |
|---|---|---|
| CPU | 100W | 150W |
| HDD | 60W | 60W |
| RAM | 40W | 40W |
| POWER AMPLIFIER | 10W | 10W |
| BACKLIGHT | 0W | 20W |
| COMMUNICATION CPU | 30W | 30W |
| SUM | 300W | 370W |

FIG. 3

| CONSUMED POWER TO BE CHANGED | OPERATIONS OF DEVICES | OPERATION FLAG |
|---|---|---|
| −10W | CPU 11: REDUCE BY 10HZ | 0 |
| −10W | TURN RAM 13 OFF | 1 |
| −20W | CPU 11: REDUCE BY 20HZ | 1 |
| −20W | TURN HDD 12 OFF | 0 |
| −30W | CPU 11: REDUCE BY 30HZ | 1 |
| −30W | REDUCE BRIGHTNESS OF BACKLIGHT 15 BY 1 | 0 |

FIG. 4

| DEVICES IN SYSTEM | USUAL OPERATION VALUE | PRESENT OPERATION VALUE | LIMIT OPERATION VALUE (UPPER LIMIT) | LIMIT OPERATION VALUE (LOWER LIMIT) | LAPSE OF TIME OF FLUCTUATION | LIMIT LAPSE OF TIME OF FLUCTUATION |
|---|---|---|---|---|---|---|
| CPU | 200Hz | 100Hz | 300Hz | 50Hz | 5sec | 10sec |
| HDD | On | On | — | OFF | 0sec | — |
| RAM | On | On | — | OFF | 0sec | — |
| POWER AMPLIFIER | — | — | — | — | — | — |
| BACKLIGHT | BRIGHTNESS SET AT 3 | BRIGHTNESS SET AT 2 | BRIGHTNESS SET AT 0 (OFF) | BRIGHTNESS SET AT 5 | 10sec | — |
| COMMUNICATION CPU | 50Hz | 80Hz | 100Hz | 10Hz | 10sec | 20sec |

FIG. 12
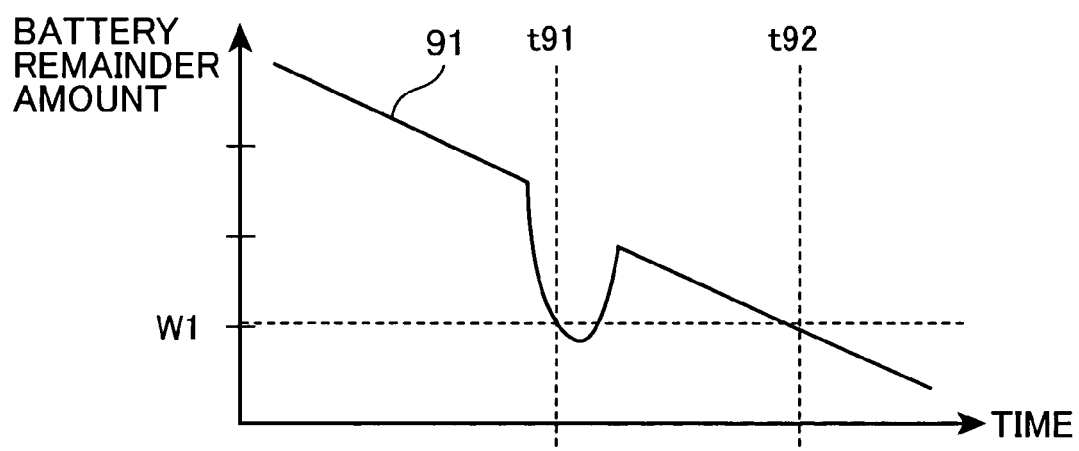
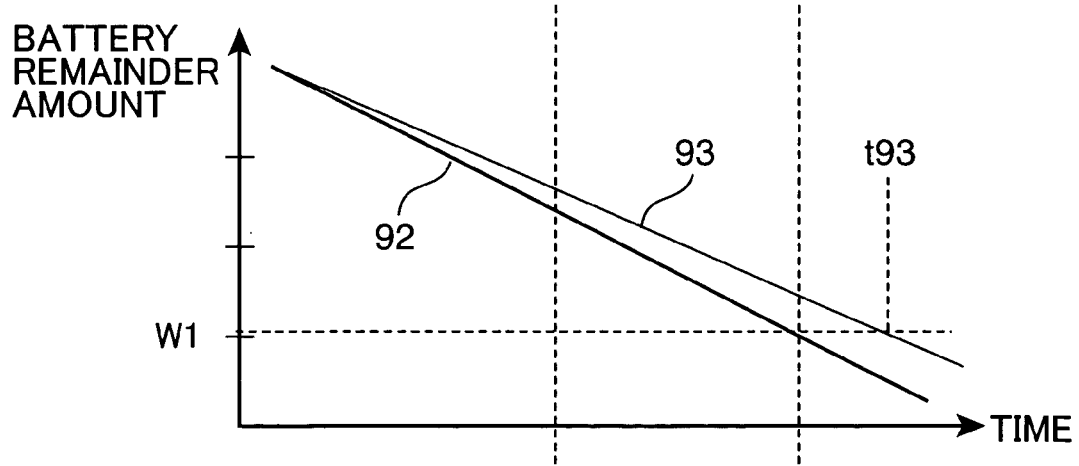

ns according to one embodiment of the present invention,

POWER-SAVE COMPUTING APPARATUS AND METHOD, A POWER-SAVE COMPUTING PROGRAM AND A PROGRAM PRODUCT

FIELD OF TECHNOLOGY

The present invention relates to a power-save computing apparatus and method for suppressing a fluctuation in a totally consumed power of one or more power-consuming devices suitably applicable to processor systems provided with a CPU (central processing unit), a power-save computing program and a program product.

TECHNOLOGICAL BACKGROUND

Mobile phones, laptop personal computers and like systems that are made portable by supplying power by means of a battery have been spread in use. Such systems have adopted various power-save technologies for suppressing power to be consumed in order to effectively use the limited power. Such power-save technologies include those for suppressing the power to be consumed for each of devices contained in the system and those for suppressing the power to be consumed in view of the entire operation of the system (see Japanese Unexamined Patent Publication No. H08-314587 (page 7, FIG. 1).

However, the conventional power-save technologies have a problem that a fluctuation in the consumed power of the entire system per unit time cannot be suppressed when the operative state of the power-consuming device changes and accordingly, the consumed power of this device fluctuates. Batteries have such a characteristic that a charged energy is lost within a shorter time as the consumed power largely fluctuates even if a total amount of the consumed power is same. Accordingly, the conventional power-save technologies cannot suppress the waste of the charged energy of the battery resulting from the fluctuation in the consumed power, thereby presenting a problem of unnecessarily shortening the life of the battery (i.e., period until the charged energy is lost).

SUMMARY OF THE INVENTION

In view of the problems residing in the prior art, an object of the present invention is to provide power-save computing apparatus and method capable of suppressing a fluctuation in total consumed power of one or more power-consuming devices, a power-save computing program and a program product.

In order to solve the above problems and accomplish the above object, a first aspect of the present invention is directed to a power-save computing apparatus, comprising a device information administrator for detecting a fluctuation in a total consumed power of one or more power-consuming devices, determining a consumed power to be changed so as to suppress the fluctuation, and outputting the determined consumed power to be changed.

These and other objects, features and advantages of the present invention will become more apparent upon a reading of the following detailed description and accompanying drawings.

BRIEF DESCRIPTION OF THE DRAWINGS

FIG. 2 is a table showing exemplary contents of a device information administration table of the system of FIG. 1, FIG. 3 is a table showing exemplary contents of a command conversion table of the system of FIG. 1, FIG. 4 is a table showing exemplary contents of a controlled state administration table of the system of FIG. 1, FIG. 12 is a plurality graphs showing the operation of the power-save computing apparatus of FIG. 1.

DETAILED DESCRIPTION OF THE PREFERRED EMBODIMENTS OF THE PRESENT INVENTION

Figure 1:
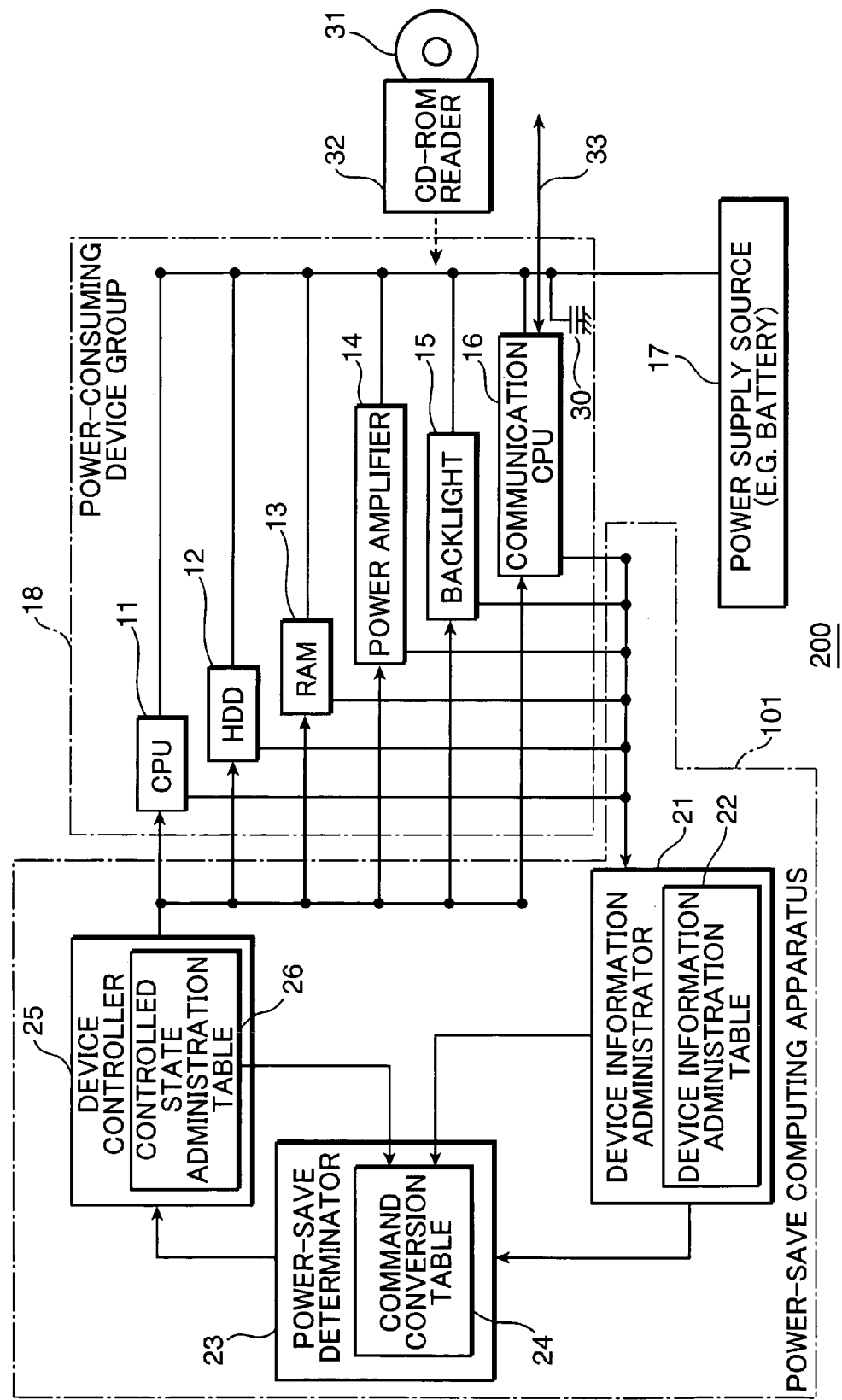
FIG. 1 is a block diagram showing a construction of a system including a power-save computing apparatus according to one embodiment of the invention.

FIG. 1 is a block diagram showing one example of a system including a power-save computing apparatus according to one embodiment of the present invention. This system 200 is constructed as a mobile communication apparatus and provided with a power supply source 17, a power-consuming device group 18, and a power-save computing apparatus 101. The power supply source 17 is for supplying power to the respective devices included in the power-consuming device group 18 and is a battery in an example of FIG. 1. The power-consuming device group 18 includes at least one power-consuming device and, in the example of FIG. 1, includes a CPU 11, a HDD (hard disk drive) 12, a RAM (random access memory) 13, a power amplifier 14, a backlight 15, and a communication CPU 16. The CPU 11 is adapted to realize functions of the system 200 such as a communication function, a displaying function, a data saving function and a data reading function in accordance with a program stored in the RAM 13 or the HDD 12. The power amplifier 14 is an amplifier for amplifying, for example, a signal that the system 200 sends to a base station. The backlight 15 is a light source used, for example, for an LCD (liquid crystal display). The communication CPU 16 is a CPU particularly in charge of a communication interface function among the functions of the system 200 in accordance with the program stored in the RAM 13 or the HDD 12.

The power-save computing apparatus 101 controls the respective devices of the power-consuming device group 18 in such a manner as to suppress a fluctuation in the consumed power of the entire power-consuming device group 18 and is provided with a device information administrator 21, a power-save determinator 23, and a device controller 25. The device information administrator 21 includes a device information administration table 22; the power-save determinator 23 possesses a command conversion table 24; and the device controller 25 includes a controlled state table.

The power-save computing apparatus 101 may be constructed by hardware which requires no program, but is preferably realized by a CPU which operates in accordance with a program. This enables the power-save computing apparatus 101 to be more simply constructed and also enables changes of the devices forming the power-consuming device group 18, i.e. addition and deletion of the devices, to be more flexibly dealt with. The program (hereinafter, power-save computing program) for realizing the functions of the power-save computing apparatus 101 corresponds to an operating system for specifying basic operations by the CPU. The power-save computing program is stored, for example, in the RAM 13 or the HDD 12 (corresponding to a specific example of a storage of the present invention). The power-save computing program can be supplied via a storage medium 31 such as a ROM (read only memory), a flexible disk or a CD-ROM and also via a transmission medium 33 such as a telephone line or a network. In FIG. 1, a CD-ROM is shown as the storage medium 31 and a telephone line connected via the communication CPU 16 as a communication interface is shown as the transmission medium 33. The power-save computing program stored in the CD-ROM can be read by additionally connecting a CD-ROM reader 32 with the power-consuming device group 18 and can be stored in the HDD 12 or the RAM 13. In the case of supplying the power-save computing program in the form of a ROM as the storage medium 33, the power-save computing apparatus 101 can execute a processing in accordance with the power-save computing program by adding this ROM to the power-consuming device group 18. The power-save computing program supplied via the transmission medium 33 is received via the communication CPU 16 and stored, for example, in the HDD 12 or the RAM 13. The transmission medium 33 is not limited to a wired transmission medium and may be a wireless transmission medium.

The CPU for realizing the functions of the power-save computing apparatus 101 may be separate from the CPU 11, but is more preferably the same with the CPU 11. If the CPU for realizing the functions of the power-save computing apparatus 101 is the same with the CPU 11, there is not only an advantage of not requiring a CPU for exclusive use to be separately provided, but also an advantage of accomplishing the suppression of a fluctuation in the total consumed power of the system 200 including the power-save computing apparatus 101 itself. Alternatively, the CPU for realizing the functions of the power-save computing apparatus 101 may be constructed separately from the CPU 11 and may be incorporated into the power-consuming device group 18 together with the CPU 11 to be controlled by the power-save computing apparatus 101. Thus, the power-save computing apparatus 101 is not necessarily constructed separately from the power-consuming device group 18 and rather desirably included in the power-consuming device group 18.

The device information administrator 21 holds the operative states of the respective devices as input information and, upon a fluctuation in the consumed power of the entire power-consuming device group 18 (referred to as a total consumed power), determines and outputs a consumed power to be changed in one or more devices in the power-consuming device group 18 (hereinafter, merely "consumed power to be changed") in order to compensate for this fluctuation and make the resulting fluctuation in the total consumed power as small as possible. The device information administrator 21 determines how much the total consumed power should be changed without specifying the device whose consumed power to be changed and outputs the determination result. For example, if the total consumed power fluctuates from 100 W to 120 W, the device information administrator 21 outputs −20 W as the consumed power to be changed in order to keep the fluctuation in the total consumed power at a minimum level.

The device information administration table 22 included in the device information administrator 21 contains, as data, one or more power-consuming devices in the power-consuming device group 18, powers consumed by the respective devices, and a total value of the powers consumed by all the devices in the power-consuming device group 18, i.e. a total consumed power. FIG. 2 shows one example of the device information administration table 22. As shown in FIG. 2, the device information administrator 21 repeatedly detects the consumed powers of the respective devices of the power-consuming device group 18 and keeps at least the consumed powers obtained in the last detection (referred to as "previous consumed powers") and those obtained in the present detection (referred to as "present consumed powers") in the device information administration table 22.

In the example of FIG. 2, the device information administration table 22 contains such information that the CPU 11, the HDD 12, the RAM 13, the power amplifier 14, the backlight 15 and the communication CPU 16 were detected to have consumed 100 W, 60 W, 40 W, 10 W and 0 W, respectively, in the last detection and a total consumed power was 300 W. The device information administrator 21 adds the consumed powers of the respective devices to obtain the total consumed power. In this example, the device information administration table 22 further contains such information that the consumed power of the CPU 11 has increased from 100 W to 150 W, that of the backlight 15 has increased from 0 W to 20 W from the last detection and those of the other devices have remained same in the present detection. As a result, the device information administration table 22 contains such information that the present total consumed power has increased by 70 W to 370 W from the last detection.

The device information administrator 21 detects a changed amount from the previous total consumed power to the present total consumed power by subtraction. In the example of FIG. 2, the changed amount of +70 W is obtained by subtraction: 370 W-300 W. As a result, the device information administrator 21 obtains −70 W as a consumed power to be changed in order to keep the fluctuation in the total consumed power at a minimum level.

The power-save determinator 23 converts the consumed power to be changed as the input information into a control command for a device in accordance with a given condition and outputs the resulting command. The command conversion table 24 included in the power-save determinator 23 contains, as data, the devices to be controlled and commands to be given to these devices in correspondence with the consumed powers to be changed. The command conversion table 24 contains, for example, a condition for the CPU 11 or a condition for the RAM 13. Specifically, the command conversion table 24 has a rule for converting the consumed power to be changed as the input information into a control command for the device to be controlled.

FIG. 3 shows one example of the command conversion table 24. In the example of FIG. 3, when the consumed power to be changed is −10 W, there is a command to change an operation clock frequency for the CPU 11 by −10 Hz, i.e. to reduce the operation clock frequency for the CPU 11 by 10 Hz, and a command to cut the power supply to the RAM 13 off. If any of these two commands is executed, the content in the left-end column, i.e. to change the consumed power of the device in the power-consuming device group 18 by −10 W to minimize a fluctuation in the total consumed power can be realized.

In the example of FIG. 3, the command conversion table 24 contains operation flags in correspondence with the respective commands. The operation flags are set and reset by a device controller 25 as described later. The power-save determinator 23 can select only the command whose operation flag is reset to 0 without being able to select the command whose operation flag is set at 1. The power-save determinator 23 can select not only a single command, but also a combination of a plurality of commands. For example, when the consumed power to be changed is −30 W, the power-save determinator 23 may select a single command to reduce the brightness of the backlight 15 by 1 or may simultaneously select two commands; a command to reduce the operation clock frequency for the CPU 11 by 10 Hz and a command to cut the power supply to the HDD 12 off.

The power-save determinator 23 may select one command based on a given order of priority if there are a plurality of possible selections. For example, a control to change the operation clock frequency for the CPU 11 may be prioritized. Alternatively, a higher degree of priority may be set for the command located higher in the column of FIG. 3. In the latter case, the power-save determinator 23 selects the command or a combination of commands located highest in the column. For example, when the consumed power to be changed is −30 W, the power-save determinator 23 selects a combination of the command to reduce the operation clock frequency for the CPU 11 by 10 Hz and the command to cut the power supply to the HDD 12 off over the single command to reduce the brightness of the backlight 15 by 1. The order of priority can be arbitrarily set.

In the example of FIG. 3, the consumed powers to be changed are given at an interval of 10 W. In this case, the device information administrator 21 may output a value representing the interval of 10 W as the consumed power to be changed. Alternatively, the power-save determinator 23 may select a value closest to the consumed power to be changed outputted from the device information administrator 21 out of the command conversion table 24 as a consumed power to be referred. In either case, the fluctuation in the total consumed power can be more precisely suppressed as the interval of the consumed power to be changed given in the command conversion table 24 is set narrower. In the example of FIG. 3, there is only one control command for one device corresponding to one consumed power to be changed. However, generally, there may be a plurality of control commands for one device corresponding to one consumed power to be changed provided that they are simultaneously executable.

Using the command from the power-save determinator 23 as input information, the device controller 25 controls the respective devices belonging to the power-consuming device group 18 in accordance with this command. Upon receiving a command to "reduce the operation clock frequency for the CPU 11 by 20 Hz" from the power-save determinator 23, the device controller 25 converts this command into an assembler command for carrying out an operation of reducing the operation clock frequency for the CPU 11 by 20 Hz, thereby controlling the CPU 11. In addition to assembler commands for controlling the CPU 11, there are assembler commands for controlling the HDD 12, those for controlling the RAM 13, those for controlling the power amplifier 14, those for controlling the backlight 15 and those for controlling the communication CPU 16. Since such assembler commands themselves are well known, no detailed description is given thereon here.

The controlled state administration table 26 included in the device controller 25 contains usual operation values (e.g. the operation clock frequency for the CPU 11) of the devices controlled by the device controller 25, present operation values (e.g. the operation clock frequency for the CPU 11) thereof, controllable limit operation values (e.g. the CPU 11 is inoperative at a frequency below 10 MHz) thereof, lapses of time from the start of the deviation of the present operation from the usual operation value, and limit lapses of time during which the operation value can change (e.g. the CPU 11 can be clock-controlled for a consecutive period of 10 sec.).

FIG. 4 shows one example of the controlled state administration table 26. In the example of FIG. 4, the controlled state administration table 26 contains the usual operation values, the present operation values, the limit operation values (upper and lower limits), the lapses of time of fluctuation, and the limit lapses of time of the fluctuation in correspondence with the respective devices to be controlled by the device controller 25. The usual operation value is an operation value when the system 200 is in a stable state. The present operation value is a content of control that the device controller 25 presently executes for the device, i.e. the present content of operation of the device which operates upon being controlled. The present operation value is set at a value different from the usual operation value in accordance with the command outputted from the power-save determinator 23. Accordingly, the present operation value different from the usual operation value corresponds to the control command outputted from the power-save determinator 23. If there are a plurality of control commands for one device corresponding to one consumed power to be changed, a plurality of operation values are given for this device.

The limit operation values are limit values of a range of the operation value permissible from the characteristic of the device. The lapse of time of fluctuation is a lapse of time after the present operation value is deviated from the usual operation value. The limit lapse of time of fluctuation is a limit value permissible to the lapse of time of fluctuation, i.e. a permissible lapse of time. The usual operation values, the limit operation values and the limit lapses of time of fluctuation are all constants given beforehand, whereas the present operation values and the lapses of time of fluctuation are variables. Since the device controller 25 can grasp the present operation values and the lapses of time of fluctuation in the respective devices belonging to the power-consuming device group 18 to be controlled, these values in the controlled state administration table 26 are renewed in real time. The lapse of time of fluctuation can be, for example, easily calculated by setting an unillustrated timer when the present operation value is deviated from the usual operation value.

In the example of FIG. 4, for the CPU 11, 200 Hz is set as the usual operation value; 100 Hz is given as the present operation value; 300 Hz (upper limit) and 50 Hz (lower limit) are set as the limit operation values; 5 sec. is given as the lapse of time of fluctuation; and 10 sec. is set as the limit lapse of time of fluctuation. The device may have no operation value like the power amplifier 14. Generally, the upper and lower limits may be set as the limit operation values, but one or both of the upper and lower limits may not be set in some of the devices as can be seen in the examples of RAM 13 and the power amplifier 14. Concerning the RAM 13 and the HDD 12, "On" means that the power source is turned on, i.e. the power is supplied, whereas "Off"

means that the power source is turned off, i.e. no power is supplied. Concerning the backlight 15, six degrees (including 0) of brightness 0 to 5 can be set.

In the case that the present operation value of a certain device exceeds the limit operation value thereof, the device controller 25 sets the operation flag corresponding to this operation at 1 out of the commands in the command conversion table 24 in order to restrict the control of this device for the compensation of the total consumed power. This can prevent the present operation value from continuing to exceed the limit operation value.

If the lapse of time of fluctuation in a certain device exceeds the limit lapse of time of fluctuation thereof, the device controller 25 sets the operation flag corresponding to this operation at 1 out of the commands in the command conversion table 24 in order to restrict the control of this device for the compensation of the total consumed power. Accordingly, the operation flag corresponding to the command to "reduce the operation clock frequency for the CPU 11 by 10 Hz" is set at 1 in the command conversion table 24, for example, if the command to "reduce the operation clock frequency for the CPU 11 by 10 Hz" is executed beyond the limit lapse of time of fluctuation in 10 sec. From this time on, the power-save determinator 23 cannot select the command to "reduce the operation clock frequency for the CPU 11 by 10 Hz". Accordingly, the device controller 25 ends the control of the CPU 11 in accordance with the command to "reduce the operation clock frequency for the CPU 11 by 10 Hz". This can prevent the operation of the CPU 11 in accordance with the control command from further continuing beyond the permissible time limit. In this way, the information carried by the command conversion table 24 is renewed in accordance with the information carried by the control state administration table 26.

The information carried by the command conversion table 24 is also renewed by the information on the respective devices held by the device information administrator 21. As already shown, the command conversion table 24 may carry only the command for one specific device or may carry the commands for one or more devices. The command conversion table 24 does not carry the command for a device uncontrollable by the device controller 25.

In the case of adding a new device to the power-consuming device group 18, information on the added device is added to the device information administration table 22 and, accordingly, is also added to the command conversion table 24. Examples of adding a new device include a case where a storage capacity is extended by increasing the number of the RAMs 13 and a case where an external input/output device such as a printer or a mouse is connected via a USB interface or the like. In the case of deleting a certain device from the power-consuming device group 18, the information on the deleted device is erased from the device information administration table 22 and is also erased from the command conversion table 24.

For example, in the case of adding a printer as a new device to the power-consuming device group 18, the program as an operating system for realizing the functions of the power-save computing apparatus 101 can easily detect the addition of the printer. Thus, the device information administrator 21 can start recording the consumed power of the added printer in the device information administration table 22 and the device controller 25 can start controlling the added printer. Further, a printer driver is already installed in this operating system and includes a command concerning the printer to be held by the command conversion table 24 and information to be carried by the controlled state administration table 26 such as a usual operation value. Thus, the device information administrator 21 can add the command concerning the added printer and the device controller 25 can add the information on the printer to the controlled state administration table 26.

Attention should be paid to the fact that, when the total consumed power of the power-consuming device group 18 fluctuates in decreasing direction, the device information administrator 21 does not necessarily determine and output the consumed power to be changed to cancel out such a fluctuation. In the case that the total consumed power of the power-consuming device group 18 decreases, the device information administrator 21 preferably compares a power-saving effect for the battery as the power supply source 17 when the fluctuation in the total consumed power of the power-consuming device group 18 is kept at a minimum level and the effect caused by the decrease in the total consumed power of the power-consuming device group 18, and does not output the consumed power to be changed to the power-save determinator 23 if the power-saving effect caused by the decrease in the total consumed power of the power-consuming device group 18 is higher. This is because there are cases where the power-saving effect is higher if the total consumed power is left to decrease instead of having this decrease suppressed and the life of the battery as the power supply source 17 can be extended in the case that the total consumed power decreases.

Figure 5:
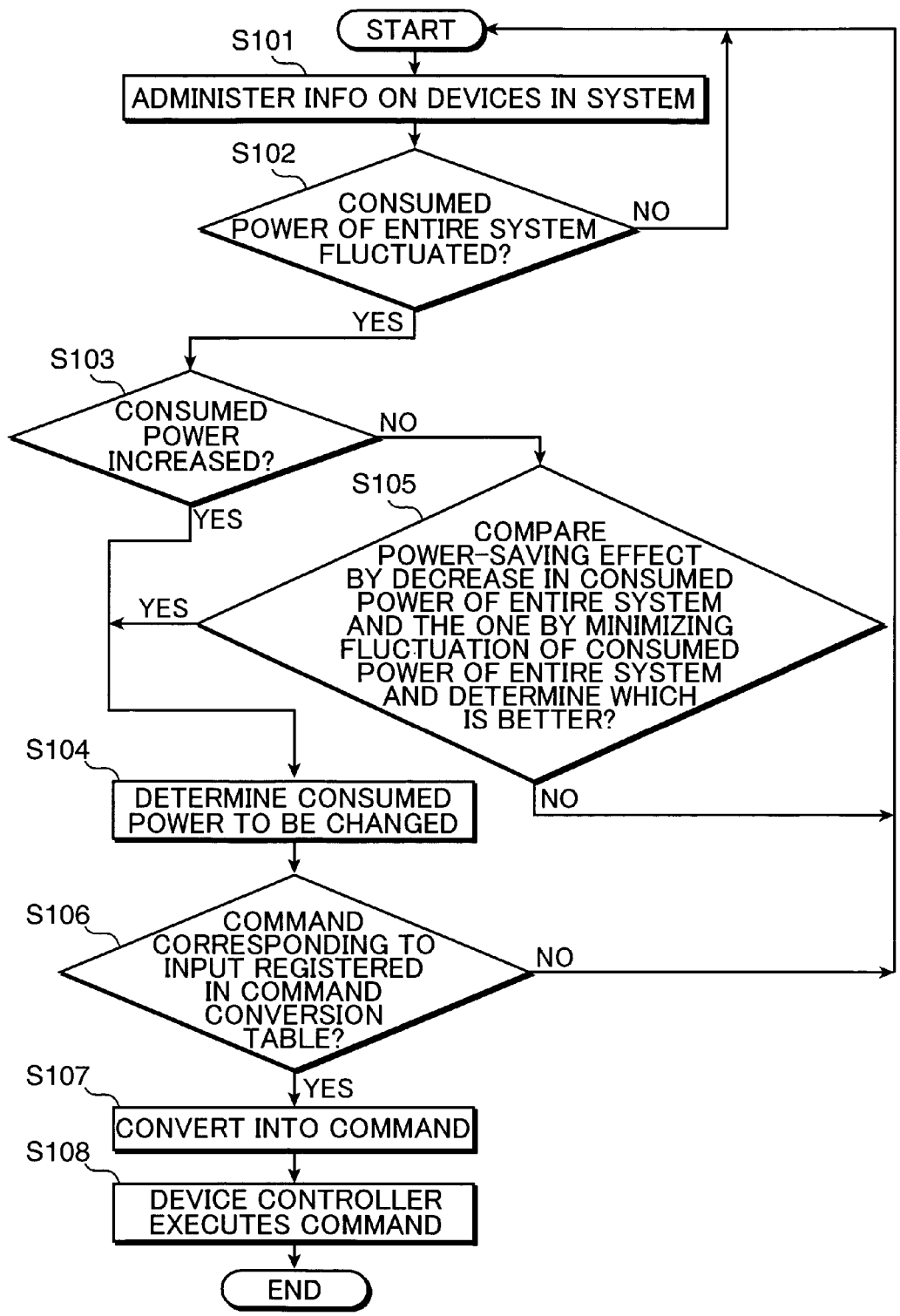
FIG. 5 is a flow chart showing an operation procedure of the power-save computing apparatus of FIG. 1.

FIG. 5 is a flow chart showing an operation procedure of the power-save computing apparatus 101 according to this embodiment. The device information administrator 21 of the power-save computing apparatus 101 administers the information on the devices within the power-consuming device group 18 (Step S101). Based on the information being administered by itself, the device information administrator 21 judges whether the consumed power of the entire power-consuming device group 18 has fluctuated (Step S102). If the consumed power has fluctuated, the device information administrator 21 judges whether the consumed power has increased or decreased (Step S103). Unless the consumed power has fluctuated, the device information administrator 21 continues to administer the information on the devices within the power-consuming device group 18.

If the consumed power is judged to have increased in Step S103, the device information administrator 21 determines the consumed power to be changed in order to keep the fluctuation in the total consumed power of the power-consuming device group 18 at a minimum level and outputs it to the power-save determinator 23 (Step S104). If the consumed power is judged to have decreased, the device information administrator 21 compares the power-saving effect for the battery as the power supply source 17 caused by the decrease in the total consumed power and the one caused by keeping the fluctuation in the total consumed power at a minimum level (Step S105). If the latter effect is higher, the device information administrator 21 outputs the consumed power to be changed to the power-save determinator 23 (Step S104). If the former effect is higher, the device information administrator 21 administers the information on the devices within the power-consuming device group 18 again.

The power-save determinator 23 refers to the command conversion table 24 (Step S106) and converts the inputted consumed power to be changed into a corresponding command (Step S107) if a command corresponding to the inputted consumed power to be changed is carried by the command conversion table 24. Unless the command is carried, this routine returns to a normal state where the device information administrator 21 administers the information on the devices within the power-consuming device group 18. When the inputted consumed power to be changed is converted into the command by the power-save determinator 23 (Step S107), this command is outputted to the device controller 25, which in turn executes the command (Step S108).

Figure 6:
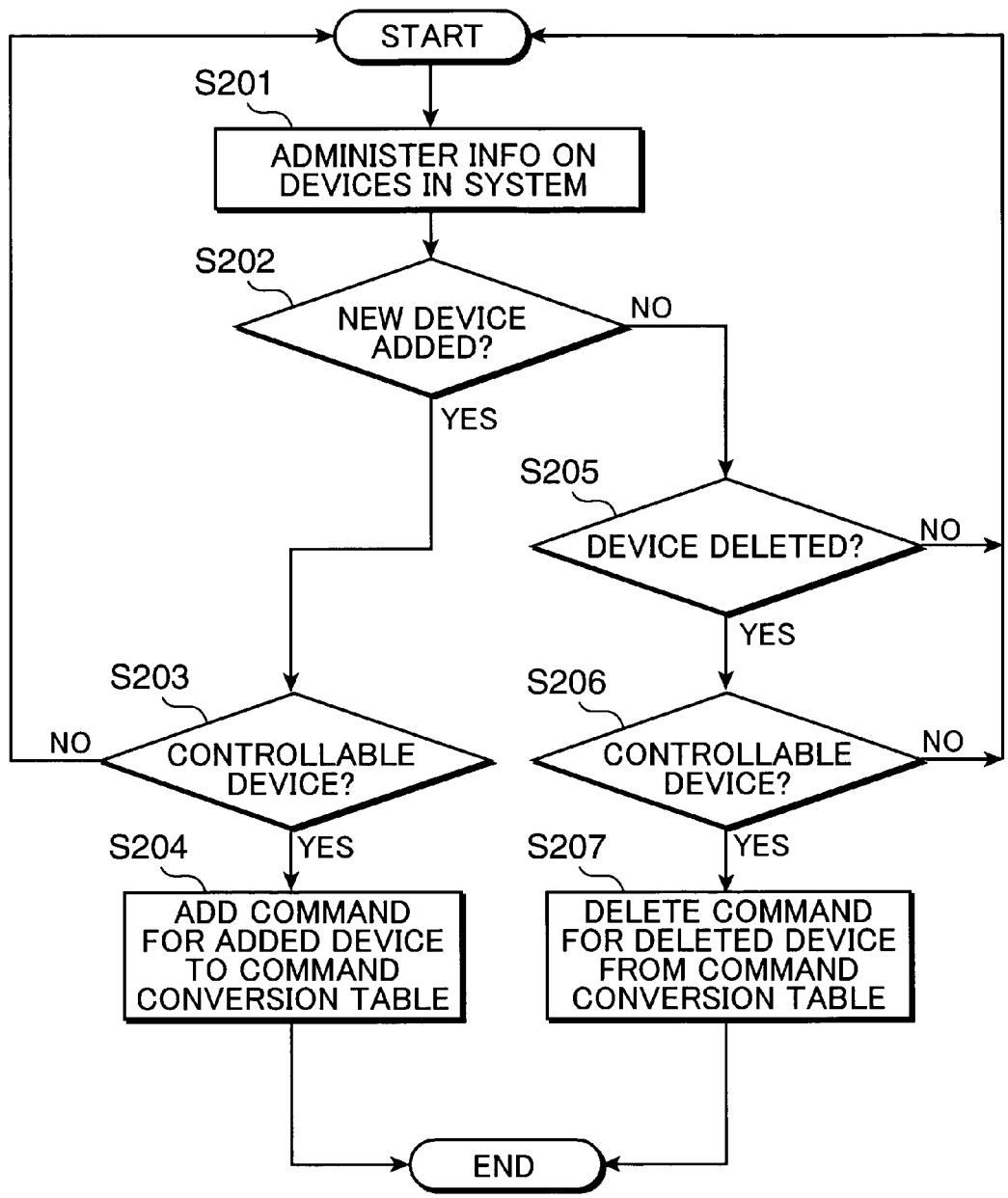
FIG. 6 is a flow chart showing an operation procedure of a device information administrator of FIG. 1.

FIG. 6 is a flow chart showing an operation procedure of the device information administrator 21 of the power-save computing apparatus 101 according to this embodiment. The device information administrator 21 administers the information on the devices within the power-consuming device group 18 (Step S201). The device information administrator 21 judges whether any device has been added (Step S202) and further judges whether this device is controllable (Step S203) if some device has been added. If this device is controllable, the device information administrator 21 adds a command for this device to the command conversion table 24 of the power-save determinator 23 (Step S204). If the device is judged to be uncontrollable in Step S203, the device information administrator 21 continues to administer the information on the devices within the power-consuming device group 18.

If no device is judged to have been added in Step S202, the device information administrator 21 judges whether any device has been deleted (Step S205). If some device has been deleted, the device information administrator 21 judges whether the deleted devices is controllable (Step S206). If the device is controllable, the device information administrator 21 deletes the command for this device from the command converting table 24 of the power-save determinator 23 (Step S207). If the judgment result in Step S205 or S206 is negative, the device information administrator 21 administers the information on the devices within the power-consuming device group 18.

Figure 7:
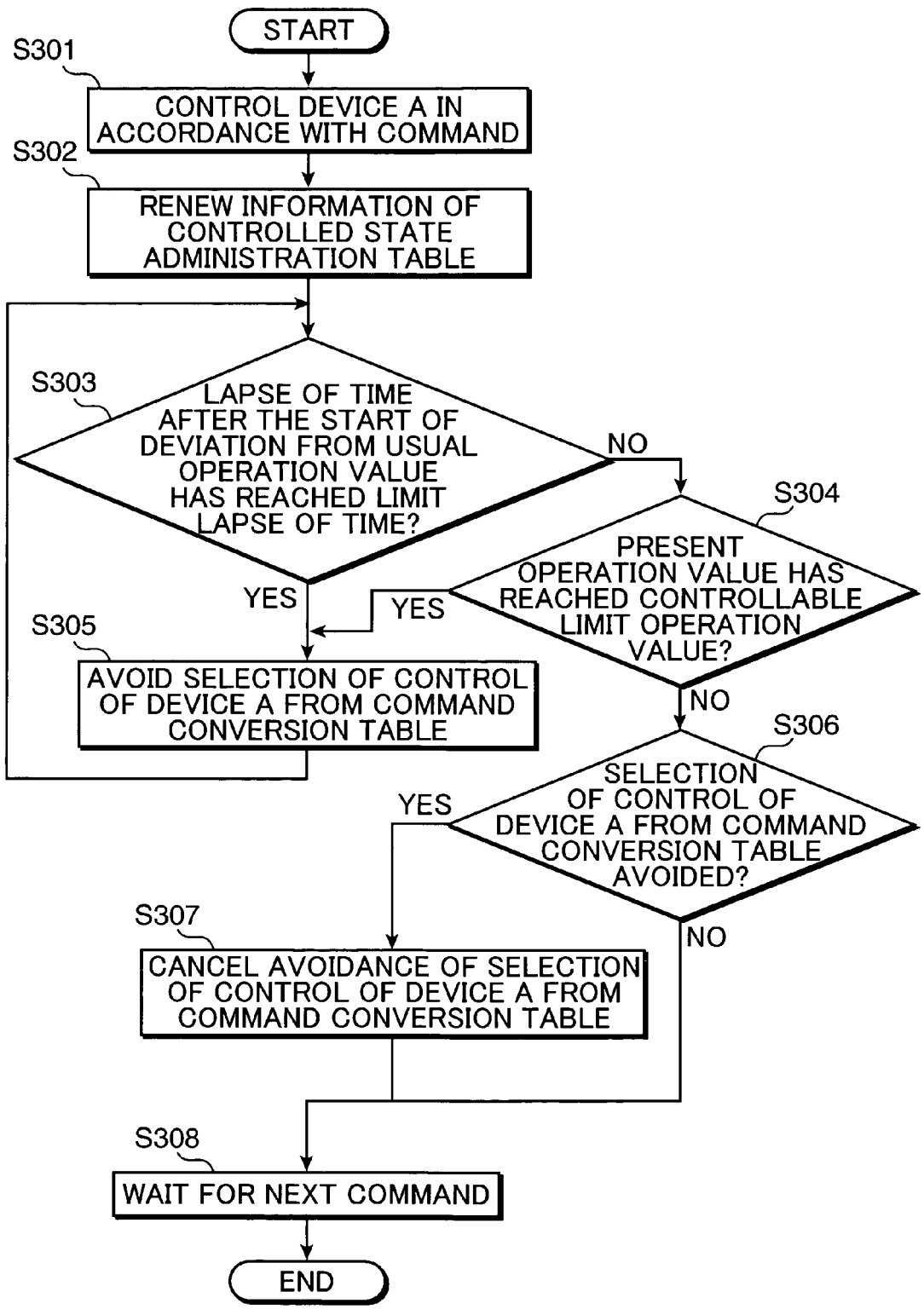
FIG. 7 is a flow chart showing an operation procedure of a device controller of FIG. 1.

FIG. 7 is a flow chart showing an operation procedure of the device controller 25 of the power-save computing apparatus 101 according to this embodiment. The device controller 25 controls a certain device A in accordance with a command (Step S301). Subsequently, the device controller 25 judges whether a lapse of time from the start of the deviation of the renewed present operation value from the usual operation value has reached the limit lapse of time during which the operation value can fluctuate (Step S303). If the judgment result is negative, the device controller 25 then judges whether the present operation value in the controlled state administration table 26 has reached a controllable limit value (Step S304). If the judgment result in Step S303 or S304 is affirmative, the device controller 25 causes the selection of the control of the aforementioned device A from the command conversion table 24 of the power-save determinator 23 to be avoided, i.e. sets the corresponding operation flag at 1 (Step S305) and then this routine returns to Step S303.

If the judgment result in Step S304 is negative, the device controller 25 checks whether the selection of the control of the aforementioned device A from the command conversion table 24 of the power-save determinator 23 is avoided, i.e. the corresponding operation flag is set at 1 (Step S306). If the selection of the control is avoided, the device controller 25 cancels the avoidance, i.e. resets the corresponding operation flag to 0 (Step S307) and this routine waits on standby for a next command (Step S308). If the selection of the control is not avoided, the device controller 25 lets the routine wait on standby for a next command (Step S308).

Each of FIGS. 8 to 11 shows a graph showing a relationship between the total consumed power of the power-consuming device group 18 detected by the device information administrator 21 and time, a graph showing a relationship between the consumed power to be changed in response to a fluctuation in the total consumed power and time, and a graph showing a relationship between the total consumed power after the execution of the command by the device controller 25 and time in this order from above. The same results can be obtained even if the total consumed power "predicted" by the device information administrator 21 to be described later is shown in the graphs instead of the total consumed power "detected" by the device information administrator 21.

Figure 8:
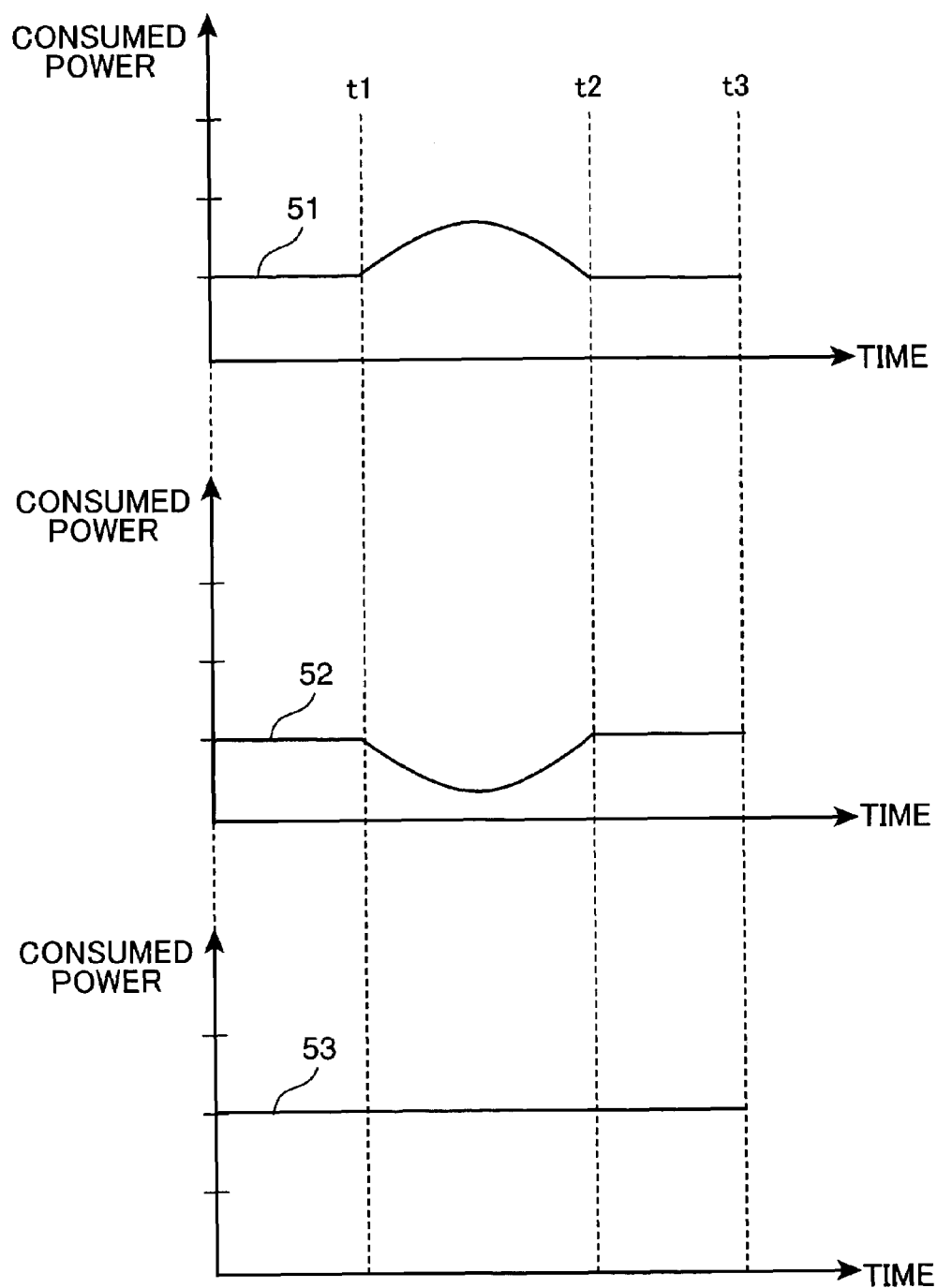
FIG. 8 is a plurality of graphs showing the operation of the power-save computing apparatus of FIG. 1.

A curve 51 of FIG. 8 shows that the total consumed power of the power-consuming device group 18 administered by the device information administrator 21 exceeds a specified level during a period from time t1 to time t2. In this case, the device information administrator 21 determines such a consumed power as to be changed from time t1 to time t2 as shown in a curve 52. As a result, a fluctuation in the total consumed power after the execution of the command by the device controller 25 is kept at a minimum level as shown in a curve 53.

Figure 9:
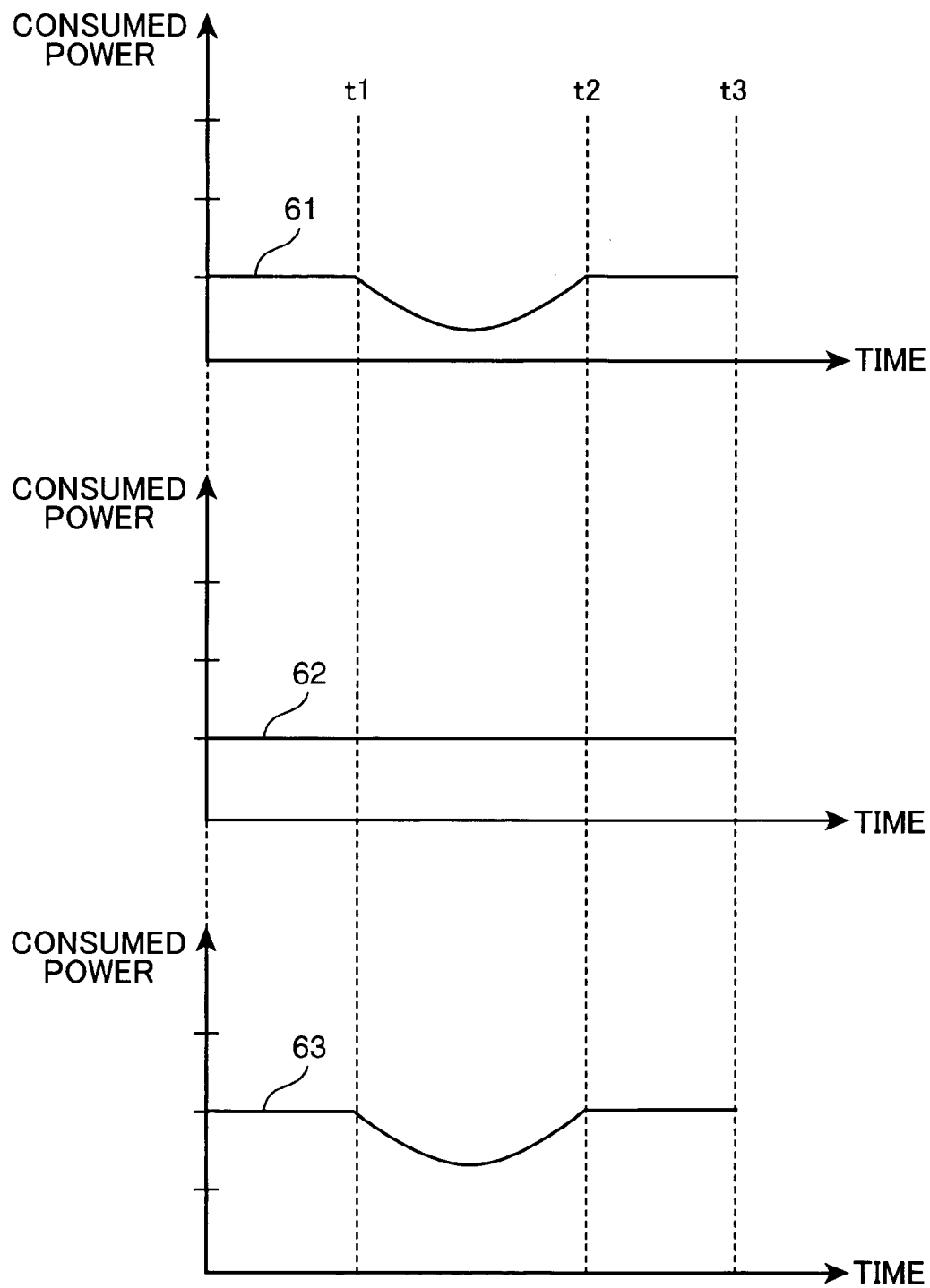
FIG. 9 is a plurality graphs showing the operation of the power-save computing apparatus of FIG. 1, FIG. 10 a plurality of is graphs showing the operation of the power-save computing apparatus of FIG. 1.

A curve 61 of FIG. 9 shows that the total consumed power of the power-consuming device group 18 administered by the device information administrator 21 falls below a specified level during a period from time t1 to time t2. In this case, the device information administrator 21 determines the consumed power to be changed as shown in a curve 62. As a result, the total consumed power of the power-consuming device group 18 is lower than the specified level from time t1 to time t2 as shown in a curve 63. FIG. 9 corresponds to a case where the device information administrator 21 judges that the power-saving effect caused by the decrease in the total consumed power is better than the one caused by keeping the fluctuation in the total consumed power at a minimum level.

Figure 10:
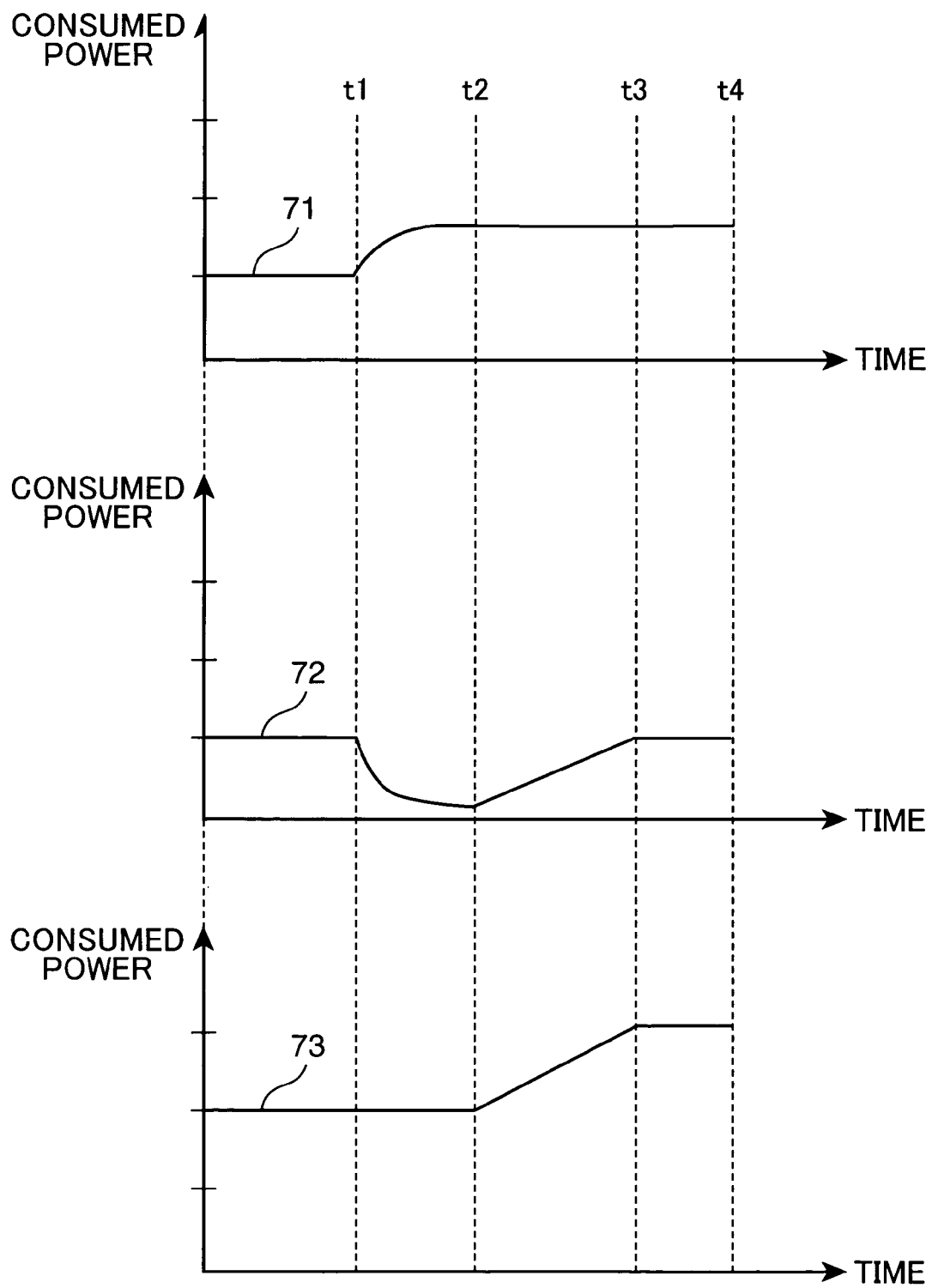

A curve 71 of FIG. 10 shows that the total consumed power of the power-consuming device group 18 administered by the device information administrator 21 increases to a specified level during a period from time t1 to time t2 and is kept at this level thereafter. In this case, the device information administrator 21 determines the consumed power to be changed during the period from time t1 to time t2 as shown in a curve 72. As a result, the total consumed power after the execution of the command by the device controller 25 has its fluctuation kept at a minimum level during the period from time t1 to time t2 as shown in a curve 73. If the control of the device controller 25 has a time limit, the consumed power of the controlled device is returned as gradually as possible to an initial level during a period, from time t2 to time t3 since the consumed power of the device cannot be kept decreased, for example, after time t2.

Figure 11:
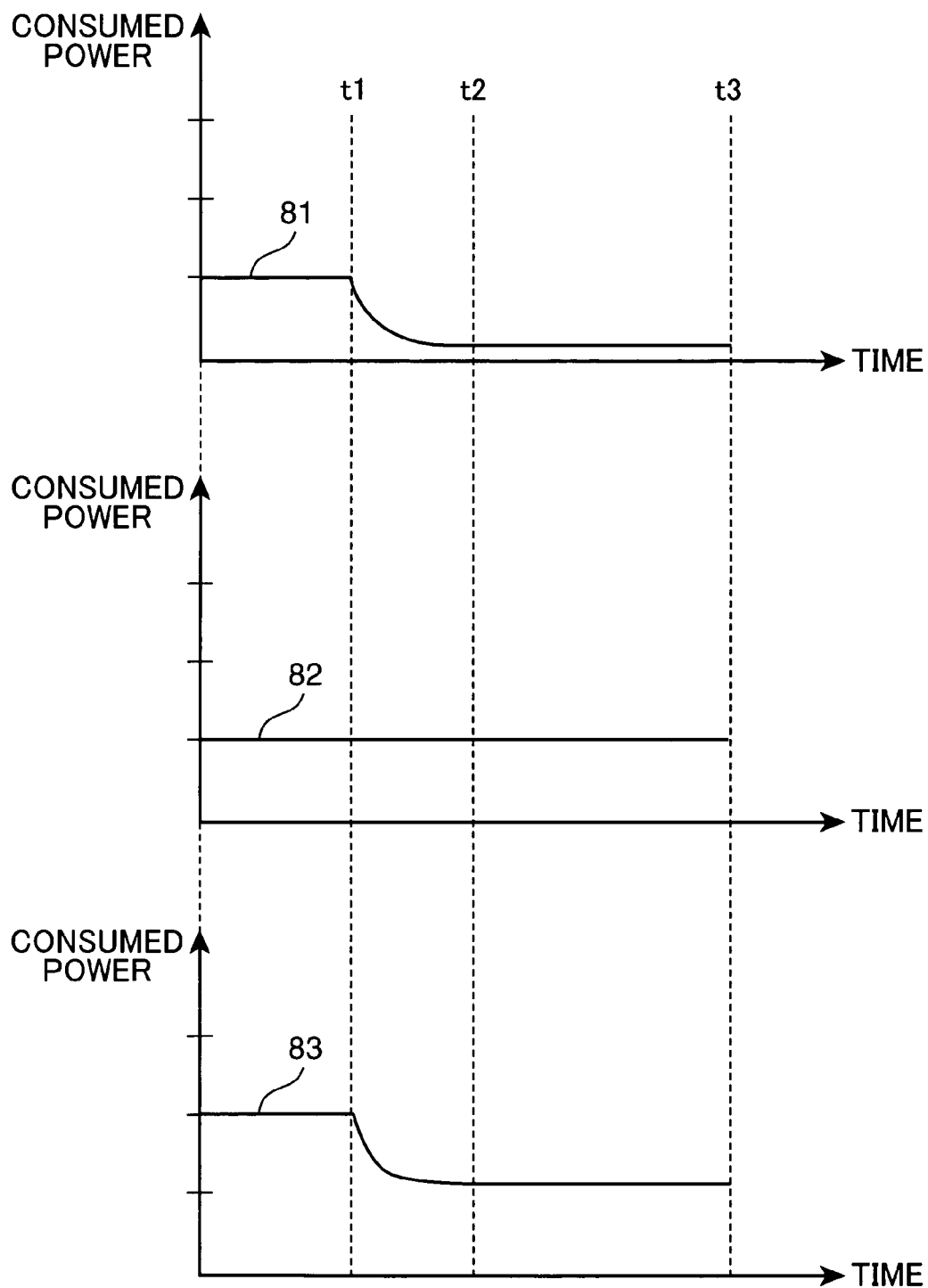
FIG. 11 is a plurality of graphs showing the operation of the power-save computing apparatus of FIG. 1.

A curve 81 of FIG. 11 shows that the total consumed power of the power-consuming device group 18 administered by the device information administrator 21 falls below a specified level during a period from time t1 to time t2 and is kept at this level thereafter. In this case, the device information administrator 21 determines the consumed power to be changed as shown in a curve 82. As a result, the total consumed power of the power-consuming device group 18 decreases over a period from time t1 to time t3 as shown in a curve 83. FIG. 11 corresponds to a case where the device information administrator 21 judges that the power-saving effect caused by the decrease in the total consumed power is better than the one caused by keeping the fluctuation in the total consumed power at a minimum level.

Since the power-save computing apparatus 101 of this embodiment is constructed and operates as above, the fluctuation in the total consumed power of the power-consuming device group 18 can be suppressed to a minimum level. Therefore, the charged energy of the battery as the power supply source 17 can be saved.

There may be a time lag of a very short time during which the program of the power-save computing apparatus 101 makes a tour of a loop until the consumed power of the device is controlled according to the consumed power to be changed after the fluctuation in the total consumed power. However, a capacitor 30 (see FIG. 1) for smoothing a supply voltage is usually provided in the power-consuming device group 18 and a temporary fluctuation in the total consumed power of the power-consuming device group 18 can be absorbed. Accordingly, the fluctuation in the total consumed power can be suppressed to the minimum level as shown in FIGS. 8 to 11 even if there is a time lag.

When the battery is used as the power supply source 17 such as a case where the system 200 is a mobile apparatus, the power-save computing apparatus 101 can further extend a usable time of the system 200 through a mechanism separate from the one provided to attain the effect of saving the charged energy of the battery. When the charged energy of the battery (so-called battery remainder amount) as the power supply source 17 falls below a specified value, the system 200 ends its operation upon judging "no battery remainder amount". Since the power-save computing apparatus 101 suppresses a sudden decrease in the charged energy of the battery, a time up to the end of the operation of the system 200 can be extended. FIG. 12 is graphs showing this situation.

A curve 91 of FIG. 12 shows a relationship between a battery remainder amount evaluated by a conventional system having no power-save computing apparatus 101 and time. In the conventional system, if there is a sudden increase in the power consumption of the device when the battery remainder amount becomes low, the battery remainder amount suddenly decreases (time t91) and, at this point of time, the system judges "no battery remainder amount" and ends its operation. In other words, the conventional system ends its operation at time t91.

A curve 92 of FIG. 12 shows a relationship between the battery remainder amount evaluated by the system 200 having the power-save computing apparatus 101 and time. Even if there is a sudden increase in the consumed power of the device when the battery remainder amount becomes low (time t91), a sudden change in the battery remainder amount can be suppressed by the operation of the power-save computing apparatus 101. As a result, the system 200 having the power-save computing apparatus 101 can operate up to an actual point of time of "no battery remainder amount" (time t92). Further, since the fluctuation in the total consumed power is suppressed by the operation of the power-save computing apparatus 101, waste of the charged energy of the battery is suppressed. Therefore, as shown in a curve 93, a decrease in the battery remainder amount is more moderate as compared to the conventional system. As a result, the system 200 can operate up to time t93 which is further delayed from time t92.

Second Embodiment

The power-save determinator 23 can also carry the relationship between the consumed powers to be changed and the control commands to the devices, i.e. a conversion rule in the form of a conditional expression instead of the command conversion table 24. The conditional expression may be stored, for example, as a part of the program specifying the operation of the power-save determinator 23 or as a reference data referred by the program in the RAM 13 or the HDD 12. For example, if the consumed power to be changed is assumed to be expressed by x(W), the power-save determinator 23 may obtain the operation clock frequency y(Hz) of the CPU 11 to be changed from a conditional expression y=a x carried thereby.

More specifically, upon receiving the input of information of −20 W as the consumed power to be changed, the power-save determinator 23 outputs a command having such a content of reducing the operation clock frequency for the CPU 11 by 20 Hz to the device controller 25, for example, in accordance with a conditional expression defining that "change in the operation clock frequency for the CPU 11 in hertz=consumed power to be changed in watt (this conditional expression corresponds to an example of the above conditional expression where the coefficient a=1).

Examples of conditional expressions using parameters of the devices other than the CPU 11 are given below. "Change in the rotation speed of the HDD 12=consumed power to be changed in watt". "Change in the number of the RAMs 13 to be operated=one tenth of the consumed power to be changed in watt". "Change in the consumed power of the power amplifier in watt=consumed power to be changed in watt". "Change in the brightness of the backlight 15=one twentieth of the consumed power to be changed in watt". "Change in the operation clock frequency for the communication CPU 16 per hertz =consumed power to be changed in watt".

As the power-save computing apparatus 101 can be so constructed as to renew the content of the command conversion table 24 by means of the device information administrator 21, it can also be so constructed as to renew the conditional expression carried by the power-save determinator 23 by means of the device information administrator 21. For example, in the case that, for a certain device B, the operation clock frequency for the device B corresponding to the consumed power to be changed is determined in accordance with a conditional expression defining that "change in the operation clock frequency for the device B in hertz =consumed power to be changed in watt", the information on the device B is added to the device information administration table 22 of the device information administrator 21 as the device B is added to the power-consuming device group 18. At the same time, the above conditional expression is added to the program or the reference data.

For example, the above conditional expression is written in a device driver of the device B, and this device driver is installed in the program as the operating system for realizing the functions of the power-save computing apparatus 101. As already mentioned, the program as the operating system is stored, for example, in the RAM 13 or the HDD 12 (corresponding to the storage of the present invention). Thus, the device information administrator 21 can add the above conditional expression to the program or the reference data carried by the power-save determinator 23 as the device B is connected with the system 200. The addition of the conditional expression to the program or the reference data carried by the power-save determinator 23 includes to enable the program carried by the power-save determinator 23 to refer as a library to the conditional expression written beforehand in the device driver.

As the power-save computing apparatus 101 can be constructed such that the commands carried by the command conversion table 24 are made selectable and unselectable by the information carried by the controlled state administration table 26, it can also be constructed such that the conditional expressions carried by the power-save determinator 23 are made referable and unreferable by the information carried by the controlled state administration table 26. For example, data corresponding to the operation flags of the command conversion table 24 may be stored in such a format corresponding to the conditional expressions (e.g. together with codes for identifying the conditional expressions) in the RAM 13, the HDD 12 or an unillustrated register included in the CPU 11, and the power-save determinator 23 may select the conditional expression to be referred to from those whose operation flags are reset to 0 by referring to the operation flags.

Third Embodiment

The device information administrator 21 can take various constructions for detecting the consumed powers of the respective devices belonging to the power-consuming device group 18. For example, resistors may be provided in power supply lines of the respective devices and supply currents flowing into the respective devices may be obtained by measuring voltage drops which occur across these resistors. Since a specific relationship holds between the supply current and the consumed power, the detection of the supply current is equivalent to the detection of the consumed power.

In the case that the functions of the power-save computing apparatus 101 are realized by the program as the operating system, the operative states of the respective devices can be grasped by the function of the operating system and, thereby, the consumed powers can be evaluated. For example, the respective devices in the system 200 output their operative states to the device information administrator 21, which obtains the operative states of the respective devices in the system 200. The device information administrator 21 can evaluate the consumed powers of the respective devices based on the obtained information. Such a function of the operating system has been well known as the function of the operating system installed in personal computers. If the device information administrator 21 detects the consumed powers of the respective devices using such a function of the operating system, no special hardware component such as a resistance element is required for the measurement of the supply current.

The device information administrator 21 may detect the total consumed power of the power-consuming device group 18 by measuring the current supplied from the battery as the power supply source 17. For example, a resistor may be provided in a power supply line along which the supply current from the power supply source 17 flows and the supply current supplied from the power supply source 17 can be obtained by measuring a voltage drop which occurs across the resistor. Since a specific relationship holds between the supply current supplied from the power supply source 17 and the power supplied from the power supply source 17, i.e. the total consumed power of the power-consuming device group 18, the device information administrator 21 can detect the total consumed power of the power-consuming device group 18 by detecting the supply current supplied from the power supply source 17. The device information administrator 21 determines the consumed power to be changed so as to keep the fluctuation in the detected total consumed power at a minimum level and outputs it to the power-save determinator 23.

Whichever form is taken to detect the consumed power, the device information administrator 21 is similar to the device information administrator 21 of the power-save computing apparatus according to the first embodiment in that it can be so constructed not to output the consumed power to be changed to the power-save determinator 23 if comparing a power-saving effect for the battery as the power supply source 17 by keeping the fluctuation in the total consumed power at a minimum level and the one caused by the decrease in the total consumed power to find out that the power-saving effect caused by the decrease in the total consumed power is better when the total consumed power decreases.

Fourth Embodiment

The device information administrator 21 can predict future values of the consumed powers of the respective devices belonging to the power-consuming device group 18 instead of detecting the consumed powers of such devices. This enables the device information administrator 21 to predict a future value of the total consumed power of the power-consuming device group 18. Further, the device information administrator 21 can directly predict the future value of the total consumed power of the power-consuming device group 18. For example, if the total consumed powers of the power-consuming device group 18 evaluated by the device information administrator 21 follows a specific pattern, the device information administrator 21 can predict the future total consumed power of the power-consuming device group 18 from this specific pattern. In such a case, the device information administrator 21 determines the consumed power to be changed based on the predicted total consumed power so as to keep the fluctuation in the total consumed power at a minimum level and outputs it to the power-save determinator 23. In order to realize such a prediction, the device information administrator 21 may store a changing pattern of the total consumed power in the RAM 13 or the HDD 12.

Figure 13:
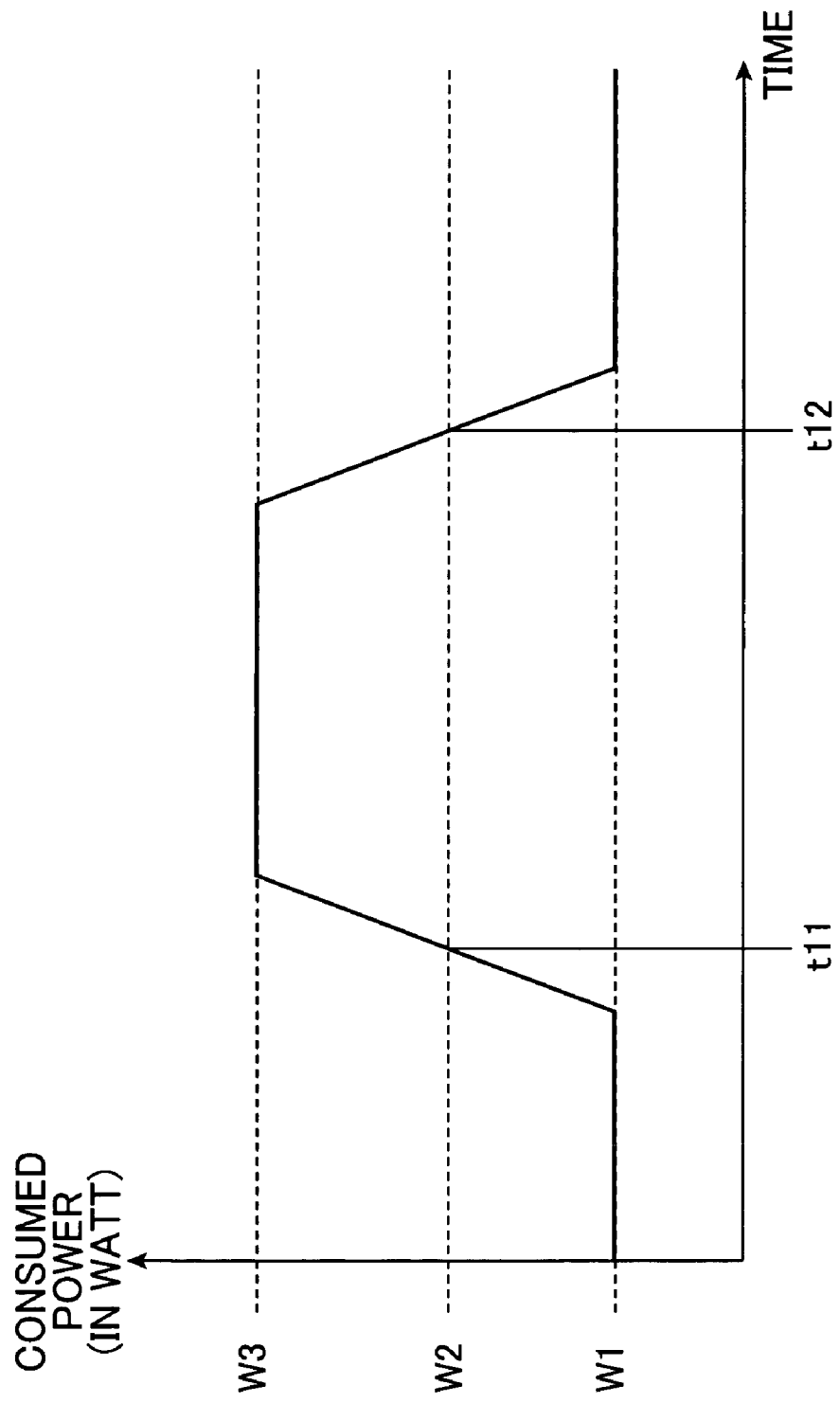
FIG. 13 is a graph showing an operation of the device information administrator to predict future values of consumed powers of the respective devices.

A specific example in which the device information administrator 21 predicts the future values of the consumed powers of the respective devices is described below. It is assumed that there are two kinds of operative states of a certain device C belonging to the power-consuming device group 18, and consumed powers (in watt) are specified as shown in FIG. 13 for these two kinds of operative states. Further, the power-save computing apparatus 101 can evaluate the consumed powers corresponding to the two kinds of operative states of the device C as a function of the operating system and is assumed to have evaluated such consumed powers. When obtaining the information on the operative state of the device C at time till, the device information administrator 21 predicts W3 as a future consumed power of the device C since the consumed power of the device C has increased from W1 to W2. The device information administrator 21 holds the future value W3 in the device information administration table 22 (see FIG. 2) as a present consumed power of the device C and determines the total consumed power of the power-consuming device group 18. The device information administrator 21 calculates an amount of fluctuation in the total consumed power based on the determined total consumed power and the previous total consumed power held in the device information administration table 22. The device information administrator 21 determines the consumed power to be changed for one or more devices within the power-consuming device group 18 from the calculated amount of fluctuation in the total consumed power and send it to the power-save determinator 23.

When obtaining the information on the operative state of the device C at time t12, the device information administrator 21 predicts W1 as a future consumed power of the device C since the consumed power of the device C has decreased from W3 to W2. The device information administrator 21 holds the future value W1 in the device information administration table 22 (see FIG. 2) as a present consumed power of the device C and determines the total consumed power of the power-consuming device group 18. Thereafter, the device information administrator 21 determines the consumed power to be changed for one or more devices within the power-consuming device group 18 from the calculated amount of fluctuation in the total consumed power and send it to the power-save determinator 23 in a similar manner. In order to realize such a prediction, the device information administrator 21 may store a changing pattern of the consumed power of the device C, e.g. such a changing pattern that the consumed power can take two values of W1 and W3, in the RAM 13 or the HDD 12.

As described above, in the power-save computing apparatus 101 according to this embodiment, the device information administrator 21 predicts the future values of the consumed powers of the respective devices belonging to the power-consuming device group 18 or the total consumed power of the power-consuming device group 18 and determines the consumed power to be changed based on the predicted value. Thus, a control of the device for compensating for the fluctuation in the total consumed power can be realized without any time lag. Therefore, the fluctuation in the total consumed power can be more effectively suppressed.

Fifth Embodiment

Although the power-save computing apparatus 101 includes the device information administrator 21 in the first embodiment, it may not include the device information administrator 21. For example, the power-save computing apparatus 101 may be constructed such that, when the power consumed by one or more devices within the power-consuming device group 18 fluctuates, these devices output information on the fluctuated consumed powers to the power-save determinator 23. In such a case, the power-save determinator 23 determines a command to control one or more specific devices whose consumed power can be changed to compensate for such a fluctuation based on the information on the fluctuated consumed power and outputs it to the device controller 25. The device controller 25 controls one or more specific devices in accordance with the inputted command.

For example, when the consumed power of the power amplifier 14 increases by 10 W, the information of 10 W is outputted to the power-save determinator 23 as the information on the fluctuated consumed power. From the information of an increase of 10 W, the power-save determinator 23 converts a command to change the consumed power for the compensation for such a fluctuation, i.e. to reduce by 10 W into such information of "reducing the consumed power of the CPU 11 by 10 W", i.e. "reducing the operation clock frequency for the CPU 11 by 10 Hz", thereby determining the command to control the device. The device controller 25 converts the command to "reduce the operation clock frequency for the CPU 11 by 10 Hz", for example, into an assembler command to control the device, thereby controlling the device as commanded.

Other Embodiments

In the respective foregoing embodiments, the device information administrator 21 determines the consumed power to be changed for one or more devices within the power-consuming device group 18 in order to keep the fluctuation in the total consumed power of the power-consuming device group 18 at a minimum level, i.e. to compensate for the fluctuation in the total consumed power. Accordingly, the device information administrator 21 outputs −20 W as the consumed power to be changed if the fluctuation in the total consumed power is +20 W. However, the device information administrator 21 may determine the consumed power to be changed to such an extent as not to compensate for the fluctuation in the total consumed power, but to moderate it. For example, the device information administrator 21 may output −10 W as the consumed power to be changed when the fluctuation in the total consumed power is +20 W. In this way, the fluctuation in the total consumed power is moderated and an adequate effect of extending the life of the battery as the power supply source 17 can be obtained.

In general, the device information administrator 21 may determine the consumed power to be changed so as to suppress (including to compensate and to moderate) the fluctuation in the total consumed power. However, in the case that the total consumed power decreases, the device information administrator 21 may leave the total consumed power to decrease instead of suppressing the decrease in the total consumed power depending on the power-saving effect for the battery as the power supply source 17 as already mentioned with reference to the first embodiment.

Brief Description of Embodiments

A power-save computing apparatus comprises a device information administrator for detecting a fluctuation in a total consumed power of one or more power-consuming devices, determining a consumed power to be changed so as to suppress the fluctuation, and outputting the determined consumed power to be changed.

With this computing apparatus, the device information administrator detects the fluctuation in the total consumed power of the one or more power-consuming devices, and determines and outputs the consumed power to be changed so as to suppress this fluctuation. Thus, the fluctuation in the total consumed power can be suppressed by controlling any one of the one or more devices using the outputted consumed power to be changed.

Preferably, the power-save computing apparatus further comprises a power-save determinator for generating and outputting a control command for at least one of the one or more devices so that the total consumed power changes in accordance with the consumed power to be changed outputted from the device information administrator, and a device controller for controlling the at least one device in accordance with the control command outputted from the power-save determinator.

With this computing apparatus, the control command for at least one device is generated and outputted so as to change the total consumed power in accordance with the consumed power to be changed outputted from the device information administrator, and the at least one device is controlled in accordance with this control command. Thus, the fluctuation in the total consumed power can be suppressed.

Preferably, the power-save determinator possesses a rule for converting the consumed power to be changed into a control command for each of the one or more devices, and the power-save determinator generates and outputs the control command to the at least one device in accordance with the rule.

With this computing apparatus, the power-save determinator has the rule for converting the consumed power to be changed into the control command for each of the one or more devices, and generates and outputs the control command for at least one device in accordance with this rule. Thus, the control command can easily be generated.

The power-save computing apparatus may further comprise a storage for storing a rule for converting the consumed power to be changed into a control command for a device addable to the one or more devices, and the device information administrator preferably causes the power-save determinator to possess the rule stored in the storage in correspondence with the added device if the addable device is added to the one ore more devices.

With this computing apparatus, the storage for storing the rule for converting the consumed power to be changed into the control command for the device addable to the one or more devices is further provided, and the device information administrator causes the power-save determinator to possess the rule stored in the storage in correspondence with the added device if the addable device is added to the one or more devices. Thus, the power-save determinator can generate and output the control command for the added device if the addable device is added.

Preferably, the device controller has a controlled state administration table carrying information on a content of operation and a permissible operation range for each of at least some of the one or more devices, and, if some content of operation exceeds the permissible range, then prohibits the power-save determinator from outputting the control command corresponding to the some content of operation.

With this computing apparatus, the device controller has the controlled state administration table carrying the information on the content of operation and the operation permissible range for each of some of the one or more devices, and, if some content of operation exceeds the permissible range, then prohibits the power-save determinator from outputting the control command corresponding to the some content of operation. Thus, the content of operation can avoid continuing to exceed the permissible range.

Preferably, the device controller has a controlled state administration table carrying information on a content of operation and a permissible lapse of time of an operation following the control-command for each of at least some of the one or more devices, and, if a lapse of time after some content of operation was changed into an operation following the control-command exceeds the corresponding permissible lapse of time, then prohibits the power-save determinator from outputting the control command corresponding to the some content of operation.

With this computing apparatus, the device controller has the controlled state administration table carrying the information on the content of operation and the permissible lapse of time of an operation following the control-command for each of some of the one or more devices, and, if a lapse of time after some content of operation was changed into an operation following the control-command exceeds the corresponding permissible lapse of time, then prohibits the power-save determinator from outputting the control command corresponding to the some content of operation. Thus, the operation following the control-command can avoid further continuing beyond the permissible time limit.

Preferably, a battery as a power source for supplying a power to the one or more devices is connected with the one or more devices, and upon detecting a fluctuation in the total consumed power in decreasing direction, the device information administrator generates and outputs the consumed power to be changed only when a power-saving effect for the battery when the decrease in the total consumed power is suppressed is better than the one for the battery caused by the decrease in the total consumed power.

With this computing apparatus, the battery as the power source for supplying the power to the one or more devices is connected with the one or more devices and, upon detecting the fluctuation in the total consumed power in decreasing direction, the device information administrator generates and outputs the consumed power to be changed only if the power-saving effect for the battery when the decrease in the total consumed power is suppressed is better than the one for the battery caused by the decrease in the total consumed power. Thus, the life of the battery can be extended longer.

Preferably, the device information administrator holds a changing pattern of a consumed power of each of the one or more devices or a changing pattern of the total consumed power of the one or more devices; predicts a future value of the total consumed power based on any one of the patterns and detection results of a fluctuation in the total consumed power of the one or more devices; and determines and outputs the consumed power to be changed so as to suppress a future fluctuation in the total consumed power.

With this computing apparatus, the device information administrator holds the changing pattern of a consumed power of each of the one or more devices or the changing pattern of the total consumed power of the one or more devices, predicts the future value of the total consumed power based on any one of the patterns and detection results of a fluctuation in the total consumed power of the one or more devices, and determines and outputs the consumed power to be changed so as to suppress the future fluctuation in the total consumed power. Thus, the control of the device for suppressing the fluctuation in the total consumed power can be realized without any time lag. Therefore, the fluctuation in the total consumed power can be more effectively suppressed.

Preferably, the power-save computing apparatus is included in the one or more devices.

With this computing apparatus, the fluctuation in the total consumed power of the one or more devices including the power-save computing apparatus can be suppressed since the power-save computing apparatus is included in the one or more devices.

A power-save computing method comprises the steps of (a) detecting a fluctuation in a total consumed power of one or more power-consuming devices, (b) determining a consumed power to be changed so as to suppress the detected fluctuation in the total consumed power, (c) generating a control command for at least one of the one or more devices so that the total consumed power changes in accordance with the determined consumed power to be changed, and (d) controlling the at least one device in accordance with the generated control command.

According to this method comprising the steps (a) to (d), the fluctuation in the total consumed power can effectively be suppressed.

A program for causing a computer realizes: (a) a function of detecting a fluctuation in a total consumed power of one or more power-consuming devices, and (b) a function of determining a consumed power to be changed so as to suppress the detected fluctuation in the total consumed power.

With this program realizing the functions (a) and (b), the fluctuation in the total consumed power can be suppressed by controlling any one of the one or more devices using the determined consumed power to be changed.

A program product comprises: (a) a program for causing a computer to realize a function of detecting a fluctuation in a total consumed power of one or more power-consuming devices, and a function of determining a consumed power to be changed so as to suppress the detected fluctuation in the total consumed power, and (b) a signal holding medium for holding the program.

With this program product comprising (a) and (b), the fluctuation in the total consumed power can be suppressed by controlling any one of the one or more devices using the determined consumed power to be changed.

Preferably, the signal holding medium is at least one of a storage medium and a transmission medium.

With this program product, since the program is stored in at least one of the storage medium and the transmission medium, the computer can realize functions specified by the program via these mediums.

This application is based on patent application No. 2003-063291 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A power-save computing apparatus comprising:
   a device information administrator for detecting a fluctuation in a total consumed power of one or more power-consuming devices, for determining a consumed power to be changed so as to suppress the fluctuation in the total consumed power, and for outputting the determined consumed power to be changed;
   a power-save determinator for generating and outputting a control command for at least one of the one or more devices so that the total consumed power changes in accordance with the consumed power to be changed outputted from the device information administrator; and
   a device controller for controlling the at least one of the one or more devices in accordance with the control command outputted from the power-save determinator,
   wherein the device controller includes a controlled state administration table for storing information on a content of operation and a permissible lapse of time of an operation following the control command for each of at least some of the one or more devices, and
   wherein, if a lapse of time after some content of operation was changed into an operation following the control command exceeds the corresponding permissible lapse of time, then the device controller prohibits the power-save determinator from outputting the control command corresponding to the some content of operation.

2. A power-save computing apparatus according to claim 1, wherein the power-save determinator possesses a rule for converting the consumed power to be changed into a control command for each of the one or more devices, and the power-save determinator generates and outputs the control command to the at least one of the one or more devices in accordance with the rule.

3. A power-save computing apparatus according to claim 2, further comprising a storage unit for storing a rule for converting the consumed power to be changed into a control command for a device to be added to the one or more devices, wherein the device information administrator causes the power-save determinator to possess the rule stored in the storage unit correspondence with the added device if the device to be added is added to the one or more devices.

4. A power-save computing apparatus according to claim 1,
   wherein the controlled state administration table stores a permissible operation range for each of at least some of the one or more devices, and
   wherein, if some content of operation exceeds the permissible range, then the device controller prohibits the power-save determinator from outputting the control command corresponding to the some content of operation.

5. A power-save computing apparatus according to claim 1, wherein a battery as a power source for supplying a power to the one or more devices is connected with the one or more devices, and upon detecting a fluctuation in the total consumed power in a decreasing direction, the device information administrator generates and outputs the consumed power to be changed only when a power-saving effect for the battery when the decrease in the total consumed power is suppressed is greater than the power-saving effect for the battery caused by the decrease in the total consumed power.

6. A power-save computing apparatus according to claim 1, wherein the device information administrator holds a changing pattern of a consumed power of each of the one or more devices or a changing pattern of the total consumed power of the one or more devices; predicts a future value of the total consumed power based on any one of the patterns and detection results of a fluctuation in the total consumed power of the one or more devices; and determines and outputs the consumed power to be changed so as to suppress a future fluctuation in the total consumed power.

7. A power-save computing apparatus according to claim 1, wherein the power-save computing apparatus is included in the one or more devices.

8. A power-save computing method comprising:
   detecting a fluctuation in a total consumed power of one or more power-consuming devices;
   determining a consumed power to be changed so as to suppress the detected fluctuation in the total consumed power;
   generating and outputting a control command for at least one of the one or more devices so that the total consumed power changes in accordance with the determined consumed power to be changed; and
   controlling the at least one device in accordance with the outputted control command,
   wherein said controlling includes referring to a controlled state administration table which stores information on a content of operation and a permissible lapse of time of an operation following the control command for each of at least some of the one or more devices, and,
   wherein, if a lapse of time after some content of operation was changed into an operation following the control command exceeds the corresponding permissible lapse of time, then said controlling prohibits an output of the control command corresponding to the some content of operation.

9. A computer-readable medium having a program stored thereon for causing a computer to perform a power-save computing method, the method comprising:

detecting a fluctuation in a total consumed power of one or more power-consuming devices;

determining a consumed power to be changed so as to suppress the detected fluctuation in the total consumed power;

generating and outputting a control command for at least one of the one or more devices so that the total consumed power changes in accordance with the determined consumed power to be changed; and controlling the at least one device in accordance with the outputted control command, wherein said controlling includes referring to a controlled state administration table which stores information on a content of operation and a permissible lapse of time of an operation following the control command for each of at least some of the one or more devices, and, wherein, if a lapse of time after some content of operation was changed into an operation following the control command exceeds the corresponding permissible lapse of time, then said controlling prohibits an output of the control command corresponding to the some content of operation.

* * * * *